United States Patent
Ronnekleiv et al.

(10) Patent No.: US 7,433,045 B2
(45) Date of Patent: Oct. 7, 2008

(54) ACTIVE COHERENCE REDUCTION FOR INTERFEROMETER INTERROGATION

(75) Inventors: Erlend Ronnekleiv, Trondheim (NO); Ole Henrik Waagaard, Rondheim (NO); Kjell Blotekjaer, Trondheim (NO); Dag Thingbo, Vikhammer (NO); Sigurd Lovseth, Trondheim (NO); Sverre Kundsen, Trondheim (NO)

(73) Assignee: Optoplan AS, Trondheim (NO)

( * ) Notice: Subject to any disclaimer, the term of this patent is extended or adjusted under 35 U.S.C. 154(b) by 508 days.

(21) Appl. No.: 10/961,326

(22) Filed: Oct. 8, 2004

(65) Prior Publication Data

US 2005/0078316 A1   Apr. 14, 2005

Related U.S. Application Data

(60) Provisional application No. 60/510,188, filed on Oct. 10, 2003.

(51) Int. Cl.
*G01B 9/02* (2006.01)

(52) U.S. Cl. .................................. 356/478; 356/477

(58) Field of Classification Search .................. 356/73.1, 356/450–521; 385/12–14
See application file for complete search history.

(56) References Cited

U.S. PATENT DOCUMENTS

| | | | |
|---|---|---|---|
| 4,818,064 A | | 4/1989 | Youngquist et al. |
| 4,872,754 A | | 10/1989 | Ensley |
| 5,140,154 A | * | 8/1992 | Yurek et al. ............. 250/227.12 |
| 5,248,992 A | | 9/1993 | Ferschl |
| 5,249,030 A | * | 9/1993 | Field et al. .................... 356/487 |
| 5,283,625 A | * | 2/1994 | Bunn, Jr. ...................... 356/463 |
| 5,351,116 A | | 9/1994 | Barton et al. |
| 5,543,914 A | * | 8/1996 | Henshaw et al. ............. 356/487 |
| 5,917,597 A | * | 6/1999 | Hall et al. ..................... 356/478 |
| 6,466,706 B1 | * | 10/2002 | Go et al. ......................... 385/12 |
| 2002/0041722 A1 | * | 4/2002 | Johnson et al. ................ 385/12 |
| 2002/0196426 A1 | * | 12/2002 | Stolte ......................... 356/73.1 |

OTHER PUBLICATIONS

U.K. Search Report, U.K. Patent Application No. 0422437.4, dated Dec. 21, 2004.

* cited by examiner

*Primary Examiner*—Gregory J. Toatley, Jr.
*Assistant Examiner*—Tri T Ton
(74) *Attorney, Agent, or Firm*—Patterson & Sheridan, L.L.P.

(57) ABSTRACT

Methods and apparatus reduce coherence of an optical signal that is used to interrogate optical interferometric sensors. The optical field phasor of the interrogation source is modulated in a controlled manner to produce a broadened optical source power spectrum at the output of the source unit. The output from the source unit is launched into an optical sensor network, comprising a multiple of optical pathways from its input to the detection unit, where pairs of optical pathways form sensor interferometers. A compensating interferometer with delay difference similar to the sensor delay difference may be arranged in a serially coupled manner with the optical sensor network, either before or after the network. The coherence modulation may be performed through direct modulation of the source or through external modulation of the light with piezoelectric ring modulator, a Lithium niobate phase or intensity modulator, or an acoustooptic modulator.

73 Claims, 3 Drawing Sheets

ACTIVE COHERENCE REDUCTION FOR INTERFEROMETER INTERROGATION

CROSS-REFERENCE TO RELATED APPLICATIONS

This application claims benefit of U.S. provisional patent application Ser. No. 60/510,188, filed Oct. 10, 2003, which is herein incorporated by reference.

BACKGROUND OF THE INVENTION

1. Field of the Invention

The present invention relates to interferometric optical sensor systems employing active coherence reduction of the source light.

2. Description of the Related Art

The coherence function of an optical signal versus delay $\tau$ and time t is defined as the autocorrelation function of the normalized field phasor E(t) of the optical signal. In other words, the coherence function $R(\tau,t)$ equals the autocorrelation function of the light and is given by $$R(\tau, t) = \int_{t-\frac{T}{2}}^{t+\frac{T}{2}} E^*(t')E(t' + \tau)w(t' - t)dt' \quad (1)$$

In the common mathematical definition of the coherence function the integration time T in equation (1) approaches infinity, while w(t) is independent on t and equals 1/T. If two optical field phasors E(t) and E(t+$\tau$) originating from the same source with delay difference $\tau$ are combined on a detector, the visibility of the interference signal output from the detector will be proportional to the magnitude of an effective coherence function $R(\tau,t)$, which is still given by equation (1), but where w(t) equals the impulse response of the detector. If w(t) also includes the effect of electrical or digital receiver filters attached to the detector output, $R(\tau,t)$ describes the visibility of the output signals from the receiver filters. In equation (1), w(t) represents a moving average weighting function that is multiplied with the interference power term $E^{19}(t')E(t'+\tau)$. Normalization of the field phasor E(t) means that the field phasor is scaled such that $R(0,t)=1$ on the average.

It can be shown that the coherence function of the light can be defined as the Fourier transform of its optical power spectrum. The coherence time may be defined as the full width at half maximum (FWHM) of the autocorrelation function, and it can be shown that the coherence time is inversely proportional to the bandwidth of the optical power spectrum. The term "coherence length" is used for the distance that the light will travel within the coherence time. The effective coherence function discussed above can be defined as the Fourier transform of the optical power spectrum after convolution with the Fourier transform of w(t). This corresponds to taking the Fourier transform of the optical power spectrum measured with resolution bandwidth that corresponds to the bandwidth of w(t), i.e. the detector bandwidth. The effective coherence time is then the full width at half maximum (FWHM) of the effective autocorrelation function, and the effective coherence length is the distance that the light will travel within the effective coherence time.

In most practical interferometric applications it is the effective coherence function, where w(t) equals the impulse response of the detector including filters, that is of interest, and in the following we use the terms coherence function, coherence time, and coherence length when we mean the effective coherence function, effective coherence time, effective and coherence length.

Interferometric optical sensor systems will typically comprise an optical source unit, which produces an optical signal. If wavelength division multiplexing of sensor interferometers is employed, this signal may typically comprise a multiple of optical signals, each signal being confined to a separate wavelength range defining a wavelength channel. Such a multi-wavelength channel source may typically comprise a multiple of laser sources operating in different wavelength channels, and a wavelength division multiplexer arranged to combine the different wavelength signals. If time division multiplexing of sensor interferometers is employed, the optical signal from the source unit may typically comprise pulses.

The optical signal from the source unit is launched into an optical network comprising a multiple of optical pathways from its input to its output, and where some pairs of optical pathways form sensor interferometers. The difference in delay between two paths forming a sensor interferometer is called the sensor delay or imbalance of that sensor. The optical network may typically use optical waveguides such as optical fiber for guiding of the optical signals. If wavelength division multiplexing is employed the optical network may typically comprise wavelength dependent couplers or wavelength dependent reflectors such as fiber Bragg grating (FBG) reflectors, arranged in a manner such that optical signals belonging to a wavelength channel will only propagate through a limited set of the paths through the network. Thus, different sensors can be interrogated with light in different wavelength channels.

Light emerging from the output of the optical network is typically directed to a detection unit. If wavelength division multiplexing is employed the detection unit may typically comprise a wavelength division demultiplexer which separates the different wavelength channel components of the incoming light and directs the separated components to corresponding wavelength channel detectors. The detectors will typically convert the incoming light signals to output voltage or current signals that are proportional to the optical power.

The electrical signals emerging from the signal processing unit will typically be analyzed by some signal processing means to extract information dependent on the phase of the sensor interferometers, defined as the difference in phase delay experienced by the interrogating optical signal when traveling in the two arms of a sensor interferometer. The phase of a sensor interferometer is linearly dependent on the exact sensor delay of the interferometer. This information may typically carry useful information about physical parameters acting differently on the two pathways comprising each sensor interferometer. Examples of such physical parameters are acoustic vibrations or pressure fluctuations, temperature, or hydrostatic pressure. Some sensor interferometers may also be designed to be insensitive to physical parameters that one wants to measure, and rather be used as reference sensors to correct the readout from other sensor interferometers for influences from physical parameter fluctuations that one does not want to measure, but which affect the measurements from both the reference sensor and the corrected sensor. The signal processing means may typically comprise components such as analog mixers, sample and hold circuits, analog to digital converters, microprocessors, digital signal processors, etc.

The sensor system may also comprise a compensating interferometer. A compensating interferometer comprises two optical paths from its input to its output with a path imbalance, i.e. difference in transmission delay between the two paths, that is chosen to be approximately equal to that of the path delay of the sensor interferometer. The compensating interferometer is connected in series with the sensor interferometer, either after the source unit at the optical transmitter end (in which case it is called a transmitter interferometer in parts of the existing literature) or before the detector unit at the receiver end (in which case it is called a receiver interferometer in parts of the existing literature).

The compensating interferometer ensures that there will be for each sensor interferometer a pair of pathways from the source unit to the detection unit going through both the compensating interferometer and the optical network (with the compensating interferometer placed either before or after the optical network) that has a delay imbalance that is close to zero, i.e. much shorter than the sensor interferometer delay. Since the sensitivity of the interference phase to source frequency fluctuations is proportional to the delay imbalance of the optical pathways that the interfering waves have traveled, the use of a compensating interferometer can allow for the use of cheaper light sources with a lower optical frequency stability or phase stability and lower coherence, as opposed to systems that do not employ compensating interferometers. The level of frequency fluctuations that can be allowed is decided by the production uncertainty or spread in the mismatch between the compensating interferometer delay difference and the sensor interferometer delay differences. For fiber optic interferometric sensor systems this spread can depend on uncertainties in the fiber splicing process and fiber strain levels, as well as in some cases the flexibility of placement of fiber splices within the sensor housing. The uncertainty can typically be in the range of 1 to 50 mm in fiber length, corresponding to delay variations in the order of 0.01 to 0.5 ns for a dual path fiber in a reflector-based interferometer. In sensor systems comprising compensating interferometers, pairs of pathways with delay imbalances close to one and two times the sensor interferometer delay will also exist. Interference between light components with such delay imbalances can lead to nonlinear responses and noise in the sensor readout. In pulsed multiplexed systems, these interference terms are removed by pulsing of the source with pulses that are shorter than the sensor interferometer delay, resulting in that the wanted interference between pulse components that have experienced approximately equal delays from the source unit to the detection unit will be separated in time from pulse components that have experienced unequal delays. The wanted interference signal can thus be separated and extracted by time gating or discrete time sampling of the output signals from the detection unit. Due to the pulsed nature of the interrogation signals such systems can readily be adapted for time division multiplexing (TDM). Sensors belonging to different TDM channels will then have different offset transmission delays from the source unit to the detection unit, so that detected interference signals from the different sensors can be separated in the time domain by time gating or discrete time sampling of the output signals from the detection unit.

Various approaches have been disclosed for extracting the sensor phase. Most of them rely on varying the interference phase of the sensor interferometers actively as a function of time through modulation of the phase or frequency of the interrogating optical signal or by modulation of the interferometer imbalance. This ensures that the signal processing means can extract both in-phase and quadrature information about the interference of each sensor interferometer by analyzing the output signals from the detection unit as a function of time, thus enabling the interference phase to be extracted without sign ambiguity. One may for example employ the "phase generated carrier" (PGC) demodulation approach disclosed in the *Homodyne Demodulation Scheme for Fiber Optic Sensors Using Phase Generated Carrier* by A. B. A. Dandridge et al. published in IEEE J. of Quantum Electronics, Vol. QE-18, pp. 1647-1653, 1982, wherein the term PGC refers to the carrier frequencies generated at the detector at the frequency at which the interference phase is actively modulated and at harmonics of this frequency. The sensor interferometer phase can be extracted without sign ambiguity by analyzing the detector signals in a frequency band comprising minimum two of the generated frequencies. The interference phase modulation can be generated in several ways, for instance by modulation of the optical source frequency, modulation of the optical phase or frequency outside the source, or by modulating the delay in one of the interferometer arms. If a compensating interferometer is employed, interference phase modulation can be generated by modulation of the phase delay in one of the arms of the compensating interferometer. Systems where the optical signal component traveling in one of the pathways of a sensor interferometer is frequency shifted relatively to the optical signal component traveling in the other pathway of the same sensor interferometer may also be used to generate a heterodyne signal at the detector, as described in U.S. Pat. No. 6,466,706 entitled "Pulsed System and Method for Fiber Optic Sensor," resulting in a carrier signal at the detector onto which the sensor interferometer phase is encoded and can be extracted without sign ambiguity. For most of the demodulation approaches based on the PGC or heterodyning techniques, PGC frequencies or optical frequency shifts, respectively, that are at least larger than two times the readout frequency bandwidth of the demodulated sensor phase signal are required to avoid frequency overlap of the detected carrier sidebands and to avoid nonlinearities and errors in the demodulated output signals.

Phase demodulation without sign ambiguity can also be achieved without any modulation of the interference phase or generation of carrier frequencies at the detectors. For instance, a compensating interferometer placed in front of the detection unit with outputs from a 3×3 fiber coupler to two or three detectors may be used, as disclosed for a pulsed system in U.S. Pat. No. 5,946,429 entitled "Time-Division Multiplexing of Polarization-insensitive Fiber Optic Michelson Interferometric Sensor." The interference signals at the outputs from the 3×3 coupler will then be phase shifted relative to each other, thus providing both in-phase and quadrature information about the interference signal to the signal processing means.

The detection unit has a detector bandwidth that is capable of capturing all the information required by the signal and processing unit to demodulate the sensor interferometer phase with the required demodulated phase signal bandwidth. With PGC demodulation techniques the necessary detection bandwidth may typically include from 2 to 12 harmonics of the PGC frequency. With heterodyne demodulation techniques the necessary detection bandwidth may typically be in the order of one to two times the heterodyne frequency shift. With demodulation techniques employing a 3×3 fiber coupler in front of the detection unit, the necessary detection bandwidth may typically be in the order of one to a few times the required demodulated phase signal bandwidth. Due to nonlinearities in the interference phase to fringe signal response, even higher detection bandwidths may be required if the demodulated phase signal amplitude is high.

In systems employing a pulsed optical source the necessary detection bandwidth must be sufficient to avoid unwanted crosstalk in the time domain between subsequent pulses, and the necessary detection bandwidth will typically be in the order of the inverse of the pulse duration, i.e. the inverse of the sensor interferometer delay.

Additional components may also be included in the interferometric sensor system, such as for example optical amplifiers to boost the optical power emerging from the source unit before it is launched into the system, polarization controllers, power supplies, optical circulators, optical modulators for modulating the sensor interferometer phase, and more.

Interferometric sensor systems employing pulsed sources with a coherence length that is even shorter than the pulse length in combination with compensating interferometers are known from the prior art. Due to the pulsed nature of the interrogation signals such systems can readily be adapted for time division multiplexing. Pulses with duration shorter than the interferometer imbalance are generated by the source. The fraction of a pulse that follows the short path through the sensor interferometer and the long path through the compensating interferometer will then overlap at the detector with the fraction of the same pulse that follows the long path through the sensor interferometer and the short path through the compensating interferometer.

In most of the prior art references employing short coherence sources, a coherence time that is shorter than the pulse length is achieved through inherent random processes in the source such as spontaneous emission or thermal radiation. However, such random processes correspond to random fluctuations in the source frequency or phase. If the compensating interferometer delay is not perfectly matched to the sensor interferometer delay, these random frequency fluctuations will cause unwanted noise fluctuations in the readout phase, as discussed above. The '706 patent discloses an alternative approach where the optical field phasor (i.e. the complex field amplitude) of the light emerging from a coherent source is modulated in a controlled and repetitive manner by chirping the optical frequency within each pulse delivered by the source unit with an acoustooptic modulator. This ensures that the mean optical frequency of the source is not disturbed from pulse to pulse, and thus conversion from source frequency fluctuations to noise in the demodulated sensor phase signal is avoided. The minimum coherence time that can be achieved by coherence modulation using this technique is limited by the response time or the duration of the impulse response of the modulator, which is fundamentally limited by the speed of sound in the acoustooptic interaction medium to the range from 5 to 100 ns for high speed modulators, and the price and complexity of the modulators increases with increasing speed. This imposes a limit to how much the coherence time can be reduced by this technique, and thus a limit to how much the unwanted effects of the source coherence, which are discussed below, can be suppressed.

The use of low coherent sources provides several advantages, including reduced noise, crosstalk and harmonic distortion in the sensor response from interference with unwanted reflections such as Rayleigh scattering, reflections from other sensors multiplexed on the same fiber, connectors, etc. Essentially, only reflectors that are separated from the sensor reflectors by less than the coherence length of the source will contribute to errors in the demodulated signal.

If the lead fiber is of substantial length, distributed Rayleigh scattering may cause a significant amount of noise at the detectors and thus in the demodulated sensor interferometer phase signals. It can be shown that the squared Rayleigh noise contribution to the detector signal output is proportional to, $$\frac{1}{2T_f} \int_{-T_f}^{T_f} |R(\tau, t)|^2 d\tau \qquad (2)$$

where $T_f$ is the transmission delay through the fiber contributing with Rayleigh noise to the demodulated phase signal. It is thus desirable to get the integral expression in (2), which represents a Rayleigh noise suppression factor, as small as possible. If the coherence function has only one peak versus $\tau$, the integral will be directly proportional to the coherence time.

In systems employing pulsed interrogation, reflections with delay spacing from the interferometer that equals a multiple of the interrogation pulse period will interfere with the sensor reflections. If subsequent pulses are correlated with a stable or slowly varying phase relation, such reflections will contribute to crosstalk and harmonic distortion. If subsequent pulses are not correlated and the pulse phase relation varies in a random fashion such reflections will contribute to noise in the demodulated phase signal. In systems employing a common down lead and up lead fiber any losses in the lead fiber, due to for instance connector losses or directional couplers, will reduce the ratio of the reflected signal pulse amplitudes from the sensor interferometers to unwanted reflections from higher up in the lead fiber. Interference with unwanted reflections can therefore significantly degrade the quality of the demodulated readout signal.

As already mentioned, the combination of a compensating interferometer and a low coherence source reduces the requirements on the source frequency stability, since the readout phase is proportional to the product of the optical source frequency and the delay imbalance of the interfering pulses. For example, in a system with a sensor interferometer delay of $\tau=100$ ns (corresponding to 20 m of single pass delay in optical fiber), a readout phase resolution of $\Delta\phi=1$ mrad requires that the source frequency has fluctuations less than $\Delta\phi/(2\pi\tau)=160$ Hz within the demodulated bandwidth of interest if a compensating interferometer is not used. This requires advanced and expensive laser sources that must be isolated from vibrations. When a compensating interferometer that matches the sensor interferometer within $\Delta\tau=0.1$ ns (20 mm fiber) is used, the source frequency stability requirements are relaxed by three orders of magnitude to $\Delta\phi/(2\pi\Delta\tau)=160$ kHz. Due to uncertainties in fiber strain and in the fiber splicing process involved it is hard to achieve delay matching better than the order of 0.01 to 0.5 ns.

The use of low coherence sources also increases the threshold for unwanted Brillouin scattering in systems employing long lead fibers to reach remote sensor locations. The optical input power required to overcome shot noise limitations of the detector (receiver) can be high, especially if optical losses are high. In such cases, the input optical power required to overcome shot noise may exceed the threshold for stimulated Brillouin scattering (SBS) if a highly coherent source is launched into a long lead fiber. If the SBS threshold is exceeded, a large fraction of the optical input signal is scattered by phonons, which are generated due to the high optical power. This causes a large reduction of the optical power reaching the sensor (effective loss). If a common optical fiber is used for transmission to and from the sensor (as in reflective sensor systems) SBS will lead to a large signal superimposed on the reflected sensor response. Instabilities in the SBS process may also cause severe noise in the readout signal.

Acceptable system performance can therefore not be achieved when the SBS threshold is exceeded.

Provided that the fiber transmission loss is less than a few dB, in a monochromatic optical source, the SBS threshold power is inversely proportional to the lead fiber length. For higher losses (assuming a given attenuation per km and increasing fiber length), the threshold power approaches a constant level. If the bandwidth BW of the source exceeds the gain bandwidth of the SBS process, which for silica fiber may be in the range of $BW_{SBS}$=20 to 100 MHz, then the SBS threshold will also be proportional to the bandwidth ratio $BW/BW_{SBS}$, where BW is the optical bandwidth of the source. More precisely, the threshold condition is determined by the peak of the optical power spectral density of the source averaged with an optical resolution bandwidth of $BW_{SBS}$. $BW_{SBS}$ depends on the lifetime of the stimulated phonons in the fiber.

Some prior art references exist where the coherence function of the source is synthesized to have a peak at a chosen delay by modulating the source field phasor in a periodic manner, either by modulating the drive current of a source laser or by use of an external modulator. Peaks in the coherence function will then occur at multiples of the modulation period. In U.S. Pat. No. 4,818,064 entitled "Sensor Array and Method of Selective Interferometric Sensing by Use of Coherence Synthesis," this technique is used to select to which interferometer among a multiple of sensor interferometers with different sensor delay imbalances that the demodulation should be sensitive. By varying the modulation period sensors with different delay imbalances can be selected. This type of coherence synthesis provides some of the same advantages with respect to suppression unwanted effects of Rayleigh and other spurious reflections as well as stimulated Brillouin scattering as other techniques employing low coherence sources for interferometric sensor interrogation. However, since the coherence function becomes a periodic function of delay with a repetition period equal to the sensor interferometer delay, the readout will be sensitive to Rayleigh and spurious reflections that introduces pathways from the source unit to the detection unit that is spaced by any multiple of the sensor interferometer delay from the transmission delays of the sensor interferometer paths. In other words, the Rayleigh noise suppression factor as defined in equation (2) will contain unwanted contributions from a large number of coherence peaks. For comparison, the pulsed source unit described in the '706 patent will have a coherence function with peaks that repeat for every pulse repetition interval, which is typically much longer than the sensor delay. Another shortcoming of the technique disclosed in the '064 patent is that the sensitivity to fluctuations in the mean source frequency (i.e. laser frequency fluctuations) is much higher than for systems employing a compensating interferometer.

In general, interferometer interrogation techniques employing continuous wave and pulsed sources have different advantages and disadvantages that make them preferable for different applications. Pulsed source interrogation allows for time division multiplexing in addition to wavelength division multiplexing, and may therefore be advantageous for systems where multiplexing of a large number of interferometers is required. On the other hand the short dutycycle of the detected interference pulses means that rather high optical pulse powers are required to overcome the fundamental shot noise limitation of optical detection. This can be overcome by increasing the source power, for instance by incorporating a relatively expensive optical amplifier. However, in sensor systems with long transmission lead fibers to the sensor location and in addition possible significant transmission losses near the sensors the power requirement may become so high that nonlinear processes like self phase modulation and Raman power transfer, cross phase modulation, or four wave mixing and between wavelength channels may lead to problems by introducing excess noise and effective loss mechanisms to the transmitted optical signal. Furthermore, the pulsed approach requires very high speed components which may be relatively expensive such as high speed intensity modulation means for switching and high speed detection and sampling electronics. For low cost systems that do not require time division multiplexing of too many sensors and for systems where transmission losses and lead fiber lengths are large, continuous wave systems may thus provide an advantage over pulsed systems.

Thus, there exists a need for improved techniques for interrogation in interferometric sensor systems employing pulsed sources that reduce readout interferometer phase errors to Rayleigh scattering, spurious reflections, or stimulated Brillouin scattering, and which overcomes other problems with the prior art mentioned herein. There exists a further need for improved techniques for interrogation in interferometric sensor systems employing continuous wave sources that reduce readout interferometer phase errors caused by Rayleigh scattering, spurious reflections, or stimulated Brillouin scattering, and which overcomes other problems with the prior art mentioned herein.

SUMMARY OF THE INVENTION

The present invention generally applies to an interferometric sensor system that may comprise optical waveguides such as optical fibers, and other optical components such as optical waveguide couplers and optical circulators. The interferometric sensor system also comprises an optical source unit that produces light in at least one wavelength channel. The light from the optical source unit is launched into an optical network comprising a multiple of optical pathways from the source unit to the detection unit, where pairs of optical pathways form sensor interferometers, each sensor interferometer having a sensor delay difference similar to a nominal sensor delay. One of the optical pathways of a first sensor interferometer may be sensitive to a physical measurand such as acoustic vibration or acoustic pressure fluctuation, while another sensor interferometer may be insensitive to the physical measurand, thus forming a reference sensor providing information for correction of the measurement made by the first sensor interferometer. The optical network may comprise a multiple of optical wavelength selective reflectors such as fiber Bragg gratings or optical wavelength selective couplers to enable wavelength division multiplexing of the sensor interferometers. The light received from the optical network is converted to electrical signals using a detection unit, and processing means are applied to the electrical signal to extract information dependent on the phase of the sensor interferometers.

The invention provides a method for reducing noise and harmonic distortion due to unwanted reflection such as Rayleigh scattering, reflections from other sensors multiplexed on the same fiber, connectors, etc. The invention also provides a method that increases the threshold for Stimulated Brillouin Scattering (SBS). This enables more optical power to be launched into the optical network, when the optical power of the source is limited by SBS. The reduction of noise and harmonic distortion and the increase of the SBS threshold are achieved by reducing the coherence of a highly coherent optical source by coherence modulation means that modulates the output field phasor of each channel to produce a broadened optical source power spectrum.

The coherence modulation means reduces the autocorrelation of the source, where the autocorrelation function of a wavelength channel is defined as the Fourier transform of the optical source power spectrum in one wavelength channel, where the optical power spectrum is defined with a resolution bandwidth similar to the necessary detection bandwidth. Alternatively, the autocorrelation function of a wavelength channel from the source versus delay may be defined as a filter impulse response convolved with the product of the conjugate of output field phasor and the output field phasor delayed by the given delay, where the filter impulse response has a frequency representation with a bandwidth similar to the necessary detection bandwidth. The coherence time may be defined as the full width at half maximum (FWHM) of the autocorrelation function. The coherence time is inversely proportional to the bandwidth of the optical source power spectrum. An efficient coherence modulation means for use in combination with a compensating interferometer will produce an output field phasor with a coherence time that is significantly shorter than the sensor delay. If the coherence time is sufficiently short, signal components that appear due to interference formed between optical pathways, with a delay different from the sensor delay of the interrogated interferometer, will be substantially suppressed. If a compensating interferometer is not used, significant improvements can still be achieved by reducing the coherence time from that of a highly coherent laser source to a coherence time that is reduced but longer than the sensor interferometer delay, without disturbing the mean source frequency.

It is essential that the coherence modulation means produce an autocorrelation function that is stable versus time. If this is not the case, noise will be added on the signal from sensors with sensor delays that are not completely matched with the maximum of the autocorrelation function. The stability of the autocorrelation function within the necessary detection bandwidth can be achieved by modulating the output field phasor of each wavelength channel from the source in a periodic manner with a cycle frequency that is larger than the necessary detection bandwidth. Alternatively, stability of the autocorrelation function can be achieved by modulation of the output field phasor of each wavelength channel from the source in a periodic manner with a cycle frequency that is phase-locked to a demodulation carrier frequency, such as the phase generated carrier (PGC) modulation frequency in a system employing PGC demodulation or the heterodyne frequency in a system employing heterodyne demodulation.

In an embodiment, the source unit produces a continuous wave output or pulses with a duration that is different from the nominal sensor delay. A compensating interferometer is formed with two optical pathways from its input to its output that have a delay difference that is equal or substantially similar to the nominal sensor delay. The compensating interferometer is arranged in a serially coupled manner with the optical network. This compensating interferometer may either be placed between the source unit and the optical network or between the network and the detection unit. In this configuration, the compensating interferometer balances the delays of the sensors, and the phase of the sensor can be extracted from an interference signal formed between two optical pathways that have a delay difference that is close to zero. Large unwanted signal components may also appear due to interference formed between optical pathways with a delay difference close to one and two times the sensor delay. The optical source unit must therefore produce an optical signal with an autocorrelation function that is substantially reduced for delays close to one and two times the sensor delay, but close to a maximum for delays within a spread of the deviation of the delay differences of the sensor interferometers from the delay difference of the compensating interferometer.

Coherence modulation means that produces a broadened optical spectrum may be achieved by direct modulation of the source laser for each wavelength channel. If the source laser is a fiber laser, direct modulation can be achieved by periodic strain modulation of the fiber laser. If the source laser is a diode laser, direct modulation can be achieved by periodic modulation of the drive signal of the diode laser, and the modulation signal may have triangular waveform. If the source laser is a wavelength tunable diode laser, direct modulation can be achieved by periodic modulation of one or more control signals to the wavelength tunable diode laser, and the laser wavelength may have triangular waveform. A triangular waveform provides a more uniform spread of the optical spectrum than a pure sine modulation, and thus more confined peak in the coherence function with less sidelobes.

Coherence modulation means that produces a broadened optical spectrum may also be achieved by using an optical modulator that takes light output from at least one coherent light source as input and modulates the field phasor of the light before it is output from the modulator. Light from a multiple of coherent light sources operating at different wavelength channels may be combined with a wavelength division multiplexer and input to a common optical modulator, which modulates all wavelength channels simultaneously. This may provide a more cost effective solution than to use one modulator for each wavelength source. The optical modulator may be one out of an optical phase modulator, an optical amplitude modulator or an acousto-optical modulator. An optical phase modulator may comprise an optical fiber wound around a piezoelectric ring modulator, for example a lead titanate zirconate (PZT) ring modulator. In order to reduce polarization effects, the optical fiber may be twisted High Birefringence fiber or polarization maintaining fiber, where the input polarization to the polarization maintaining fiber is polarized along one of the polarization maintaining fiber eigenaxes. The optical phase modulator may also be an electro-optical phase modulator such as a lithium niobate phase modulator. Lithium niobate phase modulators have the advantage of a much higher speed than most other types of optical modulators, and much shorter coherence lengths can therefore be achieved with such a device than with for example an acousto-optic modulator. The phase modulator may modulate the phase of the output field phasor of each wavelength channel with a repeated pseudorandom pattern switching between two phase-shift values that are separated by $\pi$ radians. Other modulation patterns may also be employed. For a PZT ring modulator a sine modulation at a mechanical resonance frequency of the PZT ring may be desirable.

In another embodiment, the optical source unit produces pulses with duration similar to the nominal sensor delay in at least one wavelength channel. A sampling unit samples the output electrical signals from the detection unit at time instances when a detected signal arising from interfering portions of one of the received light pulses having propagated the pair of optical pathways forming a sensor interferometer arrives at the sampling unit. A compensating interferometer with optical pathways from its input to its output is formed with a delay difference that is equal to or substantially similar to the nominal sensor delay that is arranged in a serially coupled manner with the optical network. The compensating interferometer may either be placed between the source unit and the network or between the network and the detection unit. Coherence modulation means that produces a broadened optical spectrum is achieved using an electro-optic phase modulator such as a lithium-niobate modulator. Lithium niobate phase modulators have the advantage of a much higher speed than most other types of optical modulators, and much shorter coherence lengths can therefore be achieved with such a device than with for example an acousto-optic modulator. The phase modulator may preferably modulate the phase of the output field phasor of each wavelength channel with a repeated pseudorandom pattern switching between two phase-shift values that are separated by $\pi$ radians.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The combination of a low coherence source and a compensating interferometer may also be used in systems employing continuous wave (CW) source interrogation rather than pulsed source interrogation. If a compensating interferometer is used in combination with a phase generated carrier (PGC) technique, the PGC cannot be induced by modulating the source directly. However, it may be induced by a phase modulator placed in one of the arms of the compensating interferometer, or by modulation of the optical frequency of the light between the output of the compensating interferometer and the input to the lead fiber. The PGC can also be generated by modulating the delay in one of the interferometer arms, provided that these positions are accessible.

A basic idea of the present invention is to modulate the complex field amplitude of the signal interrogating an optical interferometer in such a way that the temporal coherence is reduced, thus reducing the sensitivity to unwanted reflections with time delays that are different from the sensor reflector. In the following we will name this "coherence modulation" of the interrogation signal. The coherence modulation can be represented mathematically by multiplication of a coherent optical field phasor in the time domain with a complex "coherence modulation function". The coherence modulation function should preferably not be random, but should have a form that ensures that the demodulated sensor signal has a low sensitivity to the coherence modulation. This can be achieved by ensuring that the mixing product of the coherence modulation function and other modulation functions (pulsing, phase modulation, PGC generation, heterodyne frequency shifting, etc.) imposed on the interrogating signal does not produce mixing products at the detector that are within the necessary frequency band required by the demodulation process.

Figure 1:
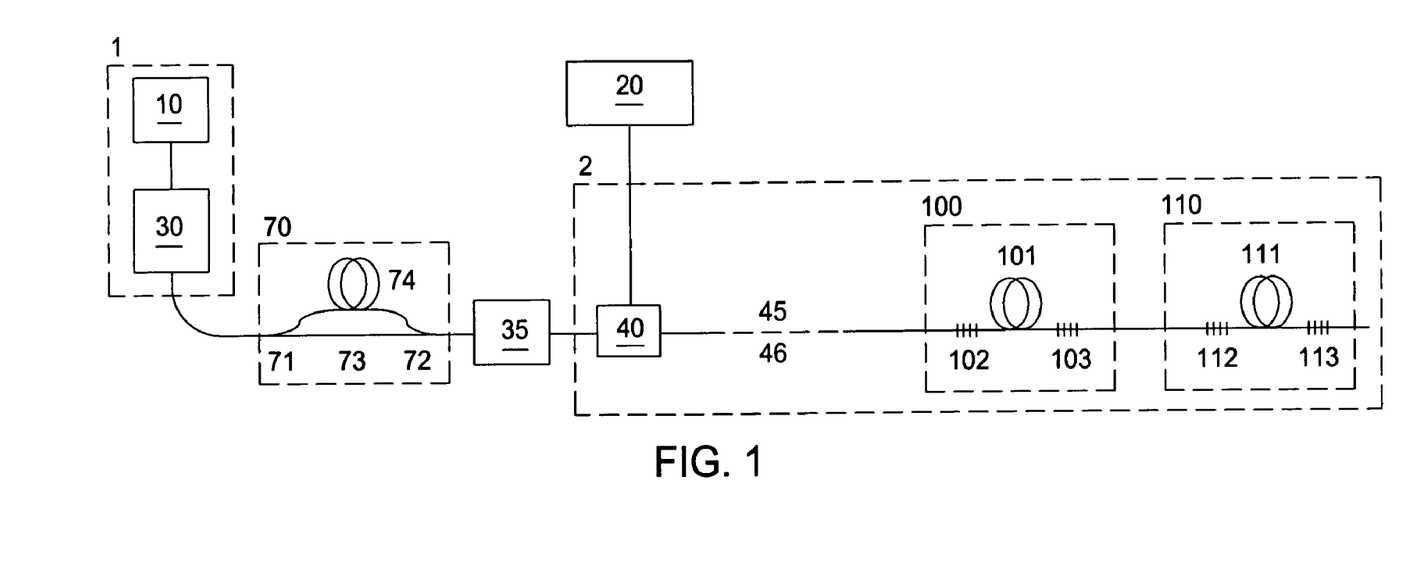
FIG. 1 is a schematic illustration of an interferometric sensor system employing continuous wave interrogation comprising a coherence modulator and a compensating interferometer.

In a system employing CW interrogation and a compensating interferometer the coherence modulation can be introduced by placing a coherence modulator with input from the output of a laser source. The laser should preferably have a moderate level of frequency noise. This is illustrated in FIG. 1 for the case where the compensating interferometer 70 is placed between the source unit 1 and the optical network 2 comprising the interferometric sensors. Light from the laser source 10 passes thorough the coherence modulator 30 before it exits the source unit 1 and enters the compensating interferometer, which here is illustrated as a Mach-Zender interferometer comprising an input coupler 71, a short arm 73, a long arm 74, and an output coupler 72. The output from the compensating interferometer is sent through a frequency modulator 35, which is responsible for generating the PGC modulation, and into the down lead fiber 45, typically via a directional coupler or circulator 40. The down lead fiber propagates the light to the sensor interferometer. Instead of the device 35 there are alternative ways of generating the PGC modulation, for instance by placing a phase modulator in one of the arms of the compensating interferometer 70. In FIG. 1, the sensor interferometer is illustrated as a Fabry-Perot type interferometer 100 employing two weak fiber Bragg Grating (FBG) reflectors 102 and 103 with typically <5% power reflectivity at the source wavelength. To achieve matching of the compensating and the sensor interferometer delays, the length of sensor fiber 101 should equal ½ times the length of the length difference between the long 74 and the short 73 fiber of the compensating interferometer.

The use of wavelength selective FBG reflectors in the sensor interferometer allows for wavelength division multiplexing (WDM) of multiple sensors, exemplified in the figure by a second sensor interferometer 110 with FBGs 112 and 113 that reflects light in a wavelength channel different from the FBGs 102 and 103 of the first interferometer. In the wavelength multiplexed configuration the source 10 should combine light from multiple sources, each source emitting within one of the WDM channel wavelengths. The detector unit 20 should comprise a WDM demultiplexer that splits the different sensor wavelengths to different detectors. The electrical signal generated at each detector is processed, for instance by any known technique in the art to extract the sensor phase of that wavelength channel.

The coherence modulator 30 could typically be a phase modulator operating at a frequency far above the PGC modulation frequency generating a phase amplitude>>1 rad. In a typical application the PGC frequency could be 20 kHz and the coherence modulation frequency could be 1 MHz.

Figure 2:
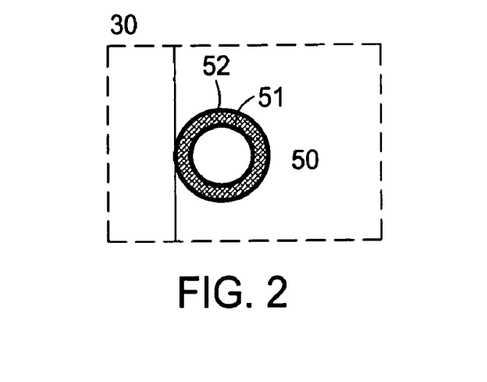
FIG. 2 is a schematic illustration of a single path coherence modulator employing a lead titanate zirconate modulator.

The phase modulator used for the coherence modulation can be formed as illustrated in FIG. 2 by winding a length of fiber (typically 5 to 20 m) around a piezoelectric, preferably PZT (lead titanate zirconate), cylinder 50 (typically with 2 mm wall thickness) with electrodes 51 and 52 at the inner and outer surface of the cylinder, and modulating the voltage between the electrodes with a sine signal at the coherence modulation frequency, which should preferably be selected to match a radial acoustic resonance in the cylinder.

A PZT phase modulator like the one illustrated in FIG. 2 may typically induce polarization modulation on the interrogating signal due to the transverse force modulating the birefringence on the fiber that is wound on the PZT ring. One approach for reducing this problem may be to use a high birefringence or polarization maintaining (PM) fiber on the PZT and to ensure that the input polarization to the PM fiber is aligned with one of the fiber eigenaxes. This can be achieved, for example, by using PM fibers and components in the optical path from the source to the coherence modulator, or by placing a polarizer at the input to the PM fiber that is aligned with one of the axes of the PM fiber and using polarization controllers to ensure maximum transmission for each wavelength channel through the polarizer.

The PZT phase modulator in FIG. 2 may also be replaced by an electro-optic phase modulator, for instance a Lithium-Niobate (LiNiob) phase modulator. The phase shift in such commercially available LiNiob modulators can typically be modulated only by one or a few $\pi$ radians. The phase modulator may modulate the phase of the output field phasor of each wavelength channel with a repeated pseudorandom pattern switching between two phase-shift values that are separated by $\pi$ radians. By a pseudorandom sequence we generally mean a signal sequence that is synthesized, not truly random, and that has reduced coherence properties with minimal sidelobes outside the coherence peak at zero delay. If the pseudorandom pattern is repeated periodically there will also be coherence peaks at every delay multiple of the repetition period. One example of pseudorandom sequences is the maximal sequences described in "*Spread Spectrum Systems with Commercial Applications,*" $3^{rd}$ edition, by Robert C. Dixon, Willey & Sons, 1994. Other modulation patterns may also be employed. The minimum phase switching interval of this sequence should preferably be much shorter than the sensor interferometer delay. LiNiob phase modulators have the advantage of a much higher speed than most other types of optical modulators, and much shorter coherence lengths combined with a better coherence sidelobe suppression can therefore be achieved with such modulators than with for example an acousto-optic modulator. Since most available LiNiob phase modulators are polarization sensitive, one typically has to ensure that the input polarization to the modulator is aligned with one of the modulator's eigenaxes. As described in the previous paragraph, this can be achieved for example by use of PM fibers and components all the way from a polarized source to the modulator, or by a combination of polarization controllers and a polarizer in front of the modulator.

Figure 3:
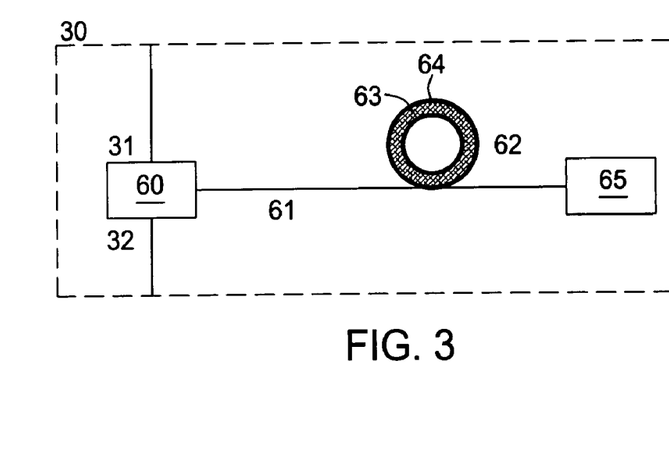
FIG. 3 is a schematic illustration of a dual path coherence modulator employing a lead titanate zirconate modulator and a Faraday rotation mirror.

The effect of the polarization modulation induced by a PZT phase modulator can be reduced by implementing the modulator 30 as illustrated in FIG. 3 with a dual path reflective device employing a PZT cylinder 62 and Faraday rotating mirror 65. Light from the laser source 10 is guided through the input fiber 31 via a coupling device 60 to the modulator fiber 61 which is wound around the PZT cylinder 62 with electrodes 63, 64. The polarization state of the light is rotated 90° by the Faraday rotating mirror 65 and is reflected back through modulator fiber 61 to the coupling device 60, which directs the light to the modulator output fiber 32. The coupling device 60 can typically be an optical circulator or an ordinary 3-dB coupler. The output fiber 32 is further connected to the compensating interferometer 70 in FIG. 1. Due to the polarization rotation property of the Faraday mirror the polarization state at the output fiber 32 should be independent on the birefringence modulation imposed by the PZT, provided that the birefringence modulation is slow compared to the optical transit time of the fiber wound on the PZT ring 55 plus the fiber length between the PZT ring and the Faraday mirror 52.

The interfering light reflected from the sensor in FIG. 1 is propagated back through the up-lead fiber 46, which may typically be identical to the down-lead fiber 45, and guided to the detection unit 20. If the down-lead and the up-lead fibers are identical, the returned signal may be split off from this common lead fiber by the coupler or circulator 40, as illustrated in FIG. 1.

For each sensor there will exist four different pathways in FIG. 1 denoted a, b, c, and d (not labeled) from the source to the detector, going through:

a: the short reference interferometer arm and the short sensor interferometer arm b: the short reference interferometer arm and the long sensor interferometer arm, c: the long reference interferometer arm and the short sensor interferometer arm, d: the long reference interferometer arm and the long sensor interferometer arm.

The interferometer formed by paths b and c will cause interference with high visibility at the detector, since delay imbalance is nominally zero. Interferometers formed by the path pairs a-b, a-c, b-d, and c-d will all have an imbalance close to or equal to the sensor delay, and the interference visibility of these interferometers will be proportional to the autocorrelation of the coherence modulation function evaluated at the sensor delay. The interferometer formed by the two paths a and d will have an imbalance close to two times the sensor delay, and the interference visibility of this interferometers will thus be proportional to the autocorrelation of the coherence modulation function evaluated at two times the sensor delay. To minimize nonlinearities in the sensor readout response and to minimize sensitivity to source frequency fluctuations, the autocorrelation of the coherence modulation function evaluated at the sensor delay and at two times the sensor delay should be made as small as possible. This can be achieved by using a high phase modulation amplitude in a PZT coherence modulator (which reduces the average amplitude of the autocorrelation function). It can also be achieved by adjusting both the amplitude and shape (distribution of harmonics) of the coherence modulation function to minimize the absolute value of the autocorrelation function at the two delays involved.

It may also be an advantage to use a periodic coherence modulation signal where the coherence modulation signal is phase locked to a harmonic of the PGC signal. If periodic sampling of the detector signals or of signals derived from these signals is used in the demodulation process, it may also be an advantage to phase lock the coherence modulation signal to a harmonic of the sampling frequency. Similarly, in any sensor system employing some type of heterodyne interferometric demodulation technique it may be an advantage to phase lock the coherence modulation signal to a harmonic of the heterodyne frequency. Such phase locking should ensure that aliasing or mixing between harmonics of the PGC, heterodyne and/or sampling frequency will mainly contribute to the demodulated phase signal near DC, which may be an advantage if the sensor is used for AC measurements.

Coherence modulation can also be achieved by direct modulation of the frequency and/or amplitude modulation of the source. For example, the frequency of a fiber distributed feedback laser can be modulated by modulating the strain in the fiber, for instance by stretching it with a piezoelectric actuator. The frequency and amplitude of a semiconductor laser can be modulated by modulating the laser drive current. Approaches using direct source modulation may seem attractive, since fewer components are required than for the external modulation approach discussed above. A potential problem with approaches employing direct modulation of a laser source for coherence reduction may be to maintain a stable shape of the coherence function versus delay and a sufficiently stable optical frequency at low fluctuation frequencies. Such instabilities will lead to increased noise contributions from interfering terms with imbalance equal to one and two times the interferometer delay. If the delays of the compensating and the sensor interferometers are not perfectly matched, it will also lead to noise in the high visibility interference of the compensated combined interferometer formed by paths b and c defined above.

It should be emphasized that variants of the coherence modulation technique described above also can be applied to CW interrogated interferometric sensor systems that do not use the PGC technique for the interrogation. For instance, a compensating interferometer with outputs from a 3×3 coupler to two or three detectors may be used to provide both in-phase and quadrature information about the interference signal to the demodulation processing system. In such systems the coherence modulation must be imposed on the optical interrogating signal before it enters the sensor interferometers.

A PZT modulator similar to the one shown in FIG. 2 can also be used for the PGC modulator, since phase modulation is equivalent to frequency modulation (the optical frequency shift is $1/(2\pi)$ times the time derivative of the optical phase shift). Because the PGC frequency is typically much smaller than the coherence modulator frequency, the PZT cylinder used for PGC generation may typically be operated near an acoustic hoop resonance rather than a wall thickness resonance.

Active coherence reduction techniques similar to the ones described above may also be applied to systems employing continuous wave interrogation without any compensating interferometer. One embodiment of such a version of the present invention may be similar to the embodiment shown in FIG. 1, but without the compensating interferometer 70. It is then essential that the coherence modulation function is designed such that coherence function of the optical output from the source unit within a wavelength channel is close to a maximum for delays close to the sensor interferometer delay. To ensure low noise in such a system that does not employ any compensating interferometer it is essential that the mean frequency of the source for each wavelength channel is stable. In a preferable implementation this can be achieved to a high degree by the use of acoustically and thermally isolated and/or stabilized single frequency fiber Er-doped distributed feedback (DFB) lasers may with active feedback to a 1480 mm fiber pigtailed diode pump laser from an intensity noise monitor detector. The coherence length of such a laser will typically be in the order of 10 km or more. If long lead fibers are used this can result in severe problems with Rayleigh scattering induced noise and stimulated Brillouin scattering, unless coherence reduction is applied. Coherence reduction can preferably be achieved by the use of a PZT phase modulator similar to the ones illustrated in FIGS. 2 and 3 and discussed in the previous paragraphs. To avoid that the coherence modulation imposes unwanted fluctuations in the output electrical signals from the detection unit the coherence modulation frequency should preferably be substantially above the necessary detection bandwidth required for the demodulation processing. The phase modulation amplitude should preferably be smaller than the optimum modulation amplitude for CW systems that do comprise compensating interferometers, as to ensure that the produced coherence length is longer than the sensor interferometer delay.

Figure 4:
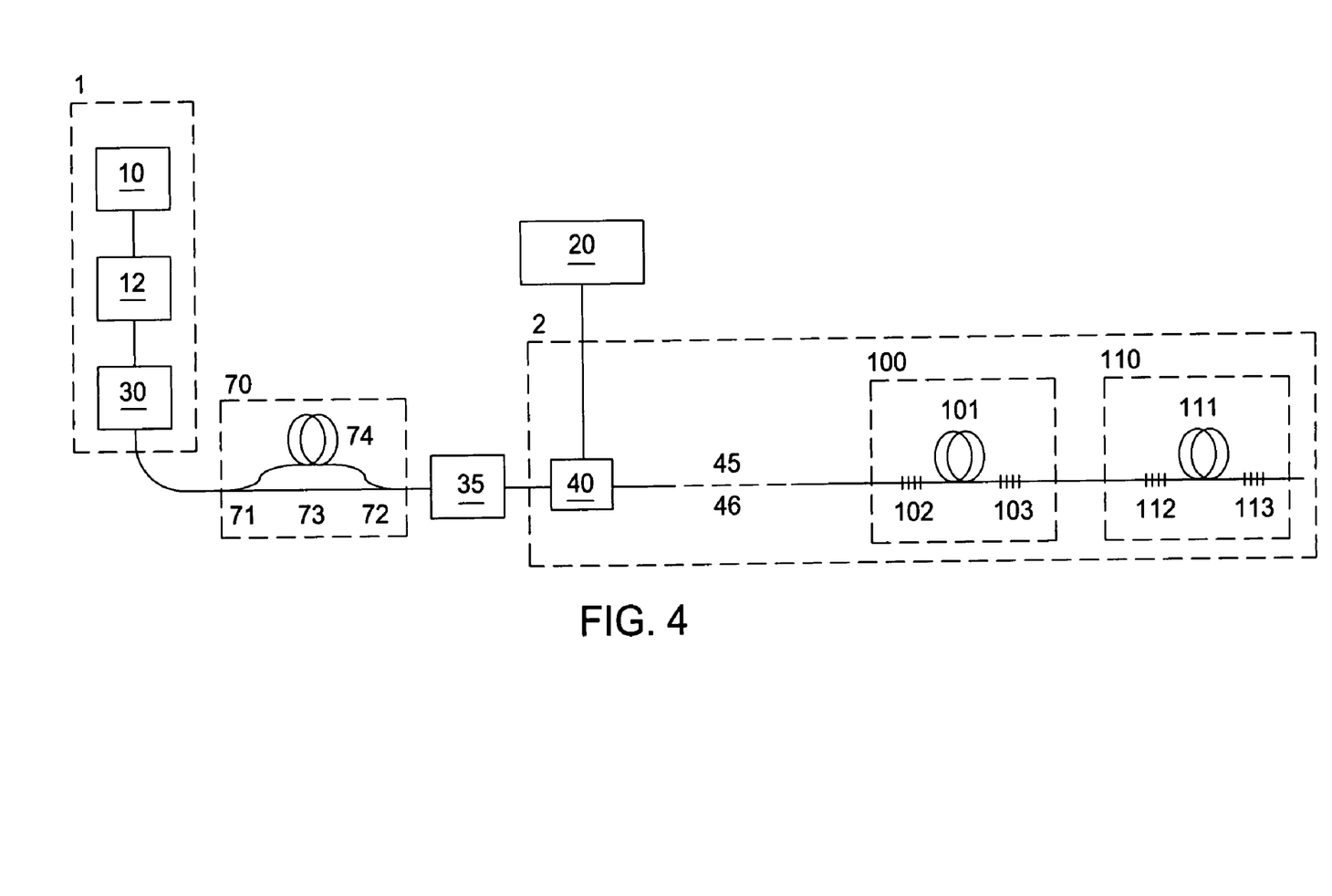
FIG. 4 is a schematic illustration of an interferometric sensor system employing pulsed interrogation comprising a coherence modulator and a compensating interferometer.

An interferometric sensor system employing pulsed interrogation may also benefit from active coherence reduction. FIG. 4 illustrates such a system comprising a coherence modulator and a compensating interferometer. The illustrated components of the system may be essentially similar to the corresponding components illustrated in FIG. 1 for a CW interrogated system, except that an optical switch 12 responsible for generating light pulses with a duration similar to the sensor interferometer delay is inserted into the source unit. The required detection bandwidth of the detection unit 20 must also be higher than for a CW interrogated system, and a time gating or discrete time sampling unit will typically be employed to separate and extract interference pulse signals at the detector output for input to the processing unit. The switch 12 may preferably be of the lithium niobate Mach Zender type, which is available commercially from several manufacturers. The modulator 35 may preferably be a lithium niobate phase modulator that modulates the phase of every second pulse emerging from the compensating interferometer 70 to create a heterodyne modulation subcarrier on the detected interference pulses. In FIG. 4, the switch is placed between the laser source 10 and the coherence modulator 30, but it may also be placed between the coherence modulator 30 and the output of the source unit 1.

The coherence modulator 30 may comprise an acousto-optic modulator that chirps the output optical frequency in a periodic manner. As discussed in the introduction section to this application, the minimum coherence time that is achievable by the use of such a modulator is limited to approximately the range from 5 to 100 ns. If an even shorter source coherence time is required it will be more preferable to use coherence modulation means that have a higher speed, such as an electro-optical phase modulator. Commercially available electro-optical phase modulators of the lithium niobate type can have response times below 0.1 ns, and it may therefore be preferable to employ this type of modulator for the coherence modulation. A preferable modulation signal may be a phase switching pattern that switches the optical phase between two values that are separated by $\pi$ radians in a pseudorandom fashion.

Other high speed modulators such as for example electro-optical amplitude modulators including lithium niobate Mach Zender modulators may also be used for the coherence modulation. In particular, it may be useful to use a chirp free or low chirp Mach Zender modulator. In a chirp free Mach Zender modulator the phase in the two Mach Zender arms are modulated in a push-pull manner. By "push-pull" we mean that the two phases are modulated with nominally equal amplitudes and opposite sign. The modulator may have an input electrode with applied voltage $V_1$ that is coupled to the waveguides in such a way that the phase in the two Mach Zender arms are modulated by $\pi V_1/(4V_\pi)$ rad and $-\pi V_1/(4V_\pi)$ rad, where $V_\pi$ is often called the half wave voltage of the modulator. Alternatively, the modulator may have two input electrodes that are driven with voltages of opposite sign $V_1$ and $-V_1$ to achieve nominal phase shifts in the two arms of $\pi V_1/(4V_\pi)$ rad and $-\pi V_1/(4V_\pi)$ rad. In both cases, the optical output field will be multiplied by a multiplier $M=K \sin(\pi V_1/(2V_\pi)+\theta_0)$, where $\theta_0$ is the bias phase of the modulator and $K$ is a complex number that depends on the insertion loss and phase delay of the device. By the terms chirp free or low chirp we mean that the phase of K does not change much in response to modulation of the drive signal $V_1$. Most commercial chirp free Mach Zender modulators have a separate bias electrode, and the voltage of this electrode should preferably be adjusted until $\theta_0=0$. The multiplier M may thus be changed between $-K$ and $+K$ via zero by changing $V_1$ between $+V_\pi$ and $-V_\pi$. The coherence modulation is implemented by modulation of $V_1$ between $+V_\pi$ and $-V_\pi$ in a pseudorandom fashion while the pulse is transmitted through the modulator.

Figure 5:
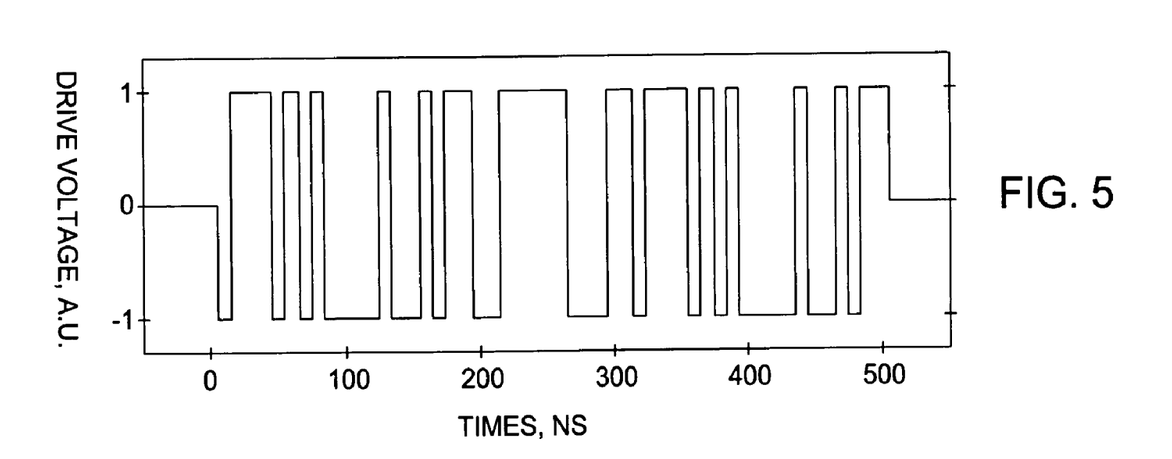
FIG. 5 is an illustration of a pseudorandom drive signal with abrupt transitions applied to the coherence modulator.

FIG. 5 illustrates an idealized pseudorandom drive signal for modulation of pulses with 500 ns duration. The drive signal changes state only at 10 ns intervals, and the switching between the states is abrupt. If a chirp free Mach Zender modulator is used, +1 and −1 on the vertical axis correspond to drive voltages of $+V_\pi$ and $-V_\pi$, respectively. If a phase modulator is used, +1 and −1 correspond to phase shifts of 0 and $\pi$, respectively. With abrupt switching, as illustrated in FIG. 5, the cases with the two types of modulators are equivalent. The coherence modulation will then ensure a coherence function that has a low value in the full delay range from −500 ns to 500 ns, except for a sharp triangular peak in the delay interval from −10 ns to 10 ns. Suppression of sidelobe peaks in the coherence function can be further optimized by apodization of the pulse power near the edges and by apodization of the detector impulse response w(t).

Due to the triangular shape of the coherence peak, the visibility of the interference signals received from a sensor will decrease linearly with the deviation of the sensor delay from the compensating interferometer delay. In practical systems the sensor delays may vary, for instance due to production uncertainties, and in some applications a resulting uncertainty in the interference visibility may lead to undesirable errors in the demodulated and demultiplexed signals. Another undesirable effect is that the sensitivity of the demodulated signal to noise in the coherence modulation drive signal in general increases with the reduction of the visibility. A coherence function that has a more rounded or parabolic shape near its top may therefore be desirable.

Figure 6:
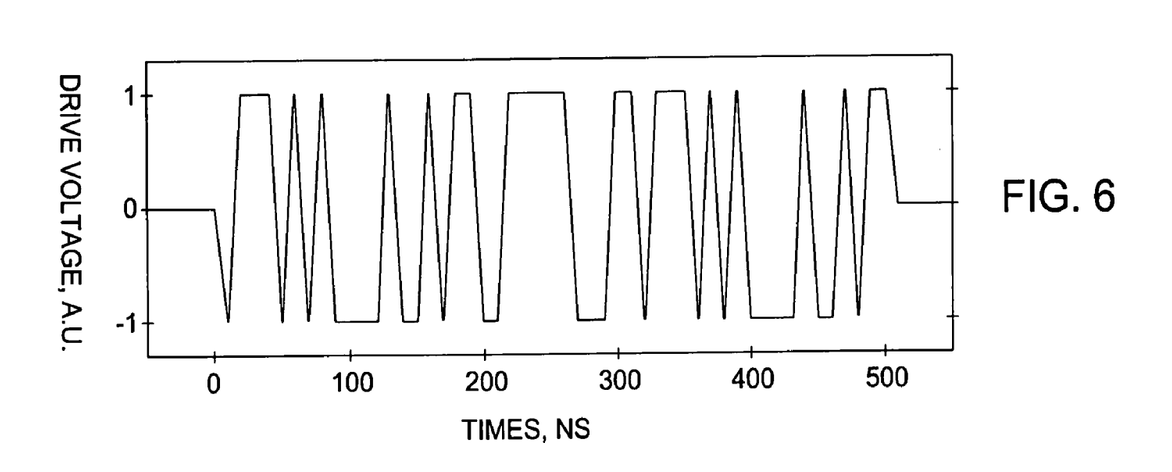
FIG. 6 is an illustration of a pseudorandom drive signal with rounded transitions applied to the coherence modulator.

One way to achieve a more rounded maximum in the coherence function is by rounding or low-pass filtering of the drive signal to the coherence modulator, as Illustrated in FIG. 6. This works with both types of modulators, but when a phase modulator is used, sidelobes will grow up in the coherence function when the phase transitions are rounded. This is undesirable in many applications since interference noise arising from spurious reflectors that are positioned at delays from the sensor reflectors that correspond to the coherence sidelobe delay or multiples of the pulse repetition period plus/minus the coherence sidelobe delay will not be suppressed effectively by the coherence modulation. When a chirp free or low chirp Mach Zender modulator is used, the magnitude of coherence sidelobes will not grow when the transitions in the modulation drive signal is rounded, and the desirable flat sidelobe characteristics of an ideal (not rounded) pseudorandom sequence is maintained. This is true provided that all positive transitions from $-V_\pi$ to $+V_\pi$ have the same shape, and that the negative transitions from $+V_\pi$ to $-V_\pi$ are identical to the positive transitions except for the change of sign. A person skilled in mathematical signal analysis may understand this based on the following reasoning.

The multiplier M applied to the optical field may be represented by the constant K multiplied with an abruptly switching pseudorandom sequence like the one in FIG. 5 and convolved with a rounding filter impulse response with a maximum duration of 10 ns. (In general the maximum duration equals the minimum delay between transitions in the abruptly switching pseudorandom sequence.) It can then be shown that the coherence function of the modulated light equals the convolution of the coherence function of the abruptly switching pseudorandom sequence with the coherence function of the rounding filter impulse response.

Another potential advantage of using a chirp free Mach Zender modulator for the coherence modulation is that the modulator can also act as the switch that generates the pulses by setting the drive voltage to the off-state ($V_1=0$) in between pulses. Alternatively, if a separate intensity modulator with limited switch extinction is used to shape the pulses before they enter the coherence modulator, the extinction ratio of the pulses can be improved by setting $V_1=0$ between the pulses. A further potential advantage is that apodization of the pulse power can be implemented by reducing the peak-to-peak drive voltage amplitude towards the ends of the pulse, i.e. apodization of the pulse power envelope.

It is also possible to use coherence modulation employing high speed modulation components such as lithium niobate modulators for interrogation of interferometric sensor systems employing pulsed interrogation but not comprising any compensating interferometer. A preferable implementation of such a system may be similar to that illustrated in FIG. 4, except that the compensating interferometer 70 is not included, and the output from the source unit 1 is directed directly to the input of the optical network 2. In this case the optical switch generates two optical pulses, both with a duration similar to or less than the sensor interferometer delay and a separation that essentially equals the sensor interferometer delay. Alternatively, the optical switch may generate a single pulse with a duration similar to two times the sensor interferometer delay. Within the pulse duration of the one or two pulses, the coherence modulator 30 generates two identical modulation patterns, for example two identical pseudorandom phase modulation sequences, that are separated in time by the sensor interferometer delay. This output pulse pattern is repeated periodically from the source unit, and the modulator 35 modulates the phase of the second half of each pulse pattern emerging from the source unit to create a heterodyne modulation subcarrier on the resulting detected interference pulses.

Like for the CW system that does not employ any compensating interferometer, a TDM system without any compensating interferometer also may require that the mean frequency of the source for each wavelength channel is stable to avoid excess noise in the demodulated sensor signal. In a preferable implementation this can be achieved to a high degree by the use of acoustically and thermally isolated and/or stabilized single frequency fiber Er-doped distributed feedback (DFB) lasers with active feedback to a 1480 mm fiber pigtailed diode pump laser from an intensity noise monitor detector.

Although the invention has been described and illustrated with respect to exemplary embodiments thereof, the foregoing and various other additions and omissions may be made therein and thereto without departing from the spirit and scope of the present invention. For example, and not by way of limitation, any or all of the above embodiments may be used as a sensor system having a sensing device for sensing pressure, force, seismic forces, temperature or strain. In addition, any or all of the above embodiments may be used as an optical control system having an optical filter (or resonator) device and either a passive filter/resonator (i.e. not tunable) or a tunable filter/resonator (e.g. in which a load is applied to the device to tune it, or the device is heated with a variable heating element, causing it to expand or shrink and so tuning it).

While the foregoing is directed to embodiments of the present invention, other and further embodiments of the invention may be devised without departing from the basic scope thereof, and the scope thereof is determined by the claims that follow.

The invention claimed is:

1. An interferometric sensor system, comprising:
   an optical source unit producing light in at least one wavelength channel, the source unit comprising a coherence modulator for modulating an output field phasor of each wavelength channel to produce a broadened optical source power spectrum;
   an optical network comprising optical pathways from the source unit to a detection unit, wherein at least one pair of the optical pathways form a sensor interferometer, the sensor interferometer having a sensor delay;
   a compensating interferometer arranged in a serially coupled manner with the optical network with optical pathways from its input to its output forming a delay, wherein autocorrelation of the source is substantially reduced for delays equal to one and two times the sensor delay relative to a maximum for delays within a spread of the deviation of the sensor delay from the delay of the compensating interferometer;
   the detection unit converting incoming light signals to output electrical signals; and
   a processor for analyzing the output electrical signals from the detection unit to extract information dependent on the phase of the sensor interferometer.

2. The sensor system of claim 1, wherein the delay between the parallel optical pathways of the compensating interferometer equals the sensor delay.

3. The sensor system of claim 1, wherein the compensating interferometer is placed between the source unit and the network.

4. The sensor system of claim 1, wherein the compensating interferometer is placed between the network and the detection unit.

5. The sensor system of claim 1, wherein the source unit produces a continuous wave output.

6. The sensor system of claim 1, wherein the source unit produces pulses with a duration different from the sensor delay.

7. The sensor system of claim 1, wherein the autocorrelation function of a wavelength channel from the source is defined as the Fourier transform of the broadened optical source power spectrum in one wavelength channel, where the optical power spectrum is defined with a resolution bandwidth similar to the necessary detection bandwidth and the source autocorrelation function is stable versus time.

8. The sensor system of claim 7, wherein stability of the autocorrelation function within the necessary detection bandwidth is achieved by modulation of the output field phasor of each wavelength channel from the source in a periodic manner with a cycle frequency that is larger than the necessary detection bandwidth.

9. The sensor system of claim 7, wherein stability of the autocorrelation function within the necessary detection bandwidth is achieved by modulation of the output field phasor of each wavelength channel from the source in a periodic manner with a cycle frequency that is phase-locked to a demodulation carrier frequency.

10. The sensor system of claim 1, wherein the autocorrelation function of a wavelength channel from the source versus delay is defined as a filter impulse response convolved with the product of the conjugate of output field phasor in the last said wavelength channel and the output field phasor in the same wavelength channel delayed by the last said delay, where the filter impulse response has a frequency representation with a bandwidth similar to the necessary detection bandwidth, and the source autocorrelation function is stable versus time.

11. The sensor system of claim 10, wherein stability of the autocorrelation function within the necessary detection bandwidth is achieved by modulation of the output field phasor of each wavelength channel from the source in a periodic manner with a cycle frequency that is larger than the necessary detection bandwidth.

12. The sensor system of claim 10, wherein stability of the autocorrelation function within the necessary detection bandwidth is achieved by modulation of the output field phasor of each wavelength channel from the source in a periodic manner with a cycle frequency that is phase-locked to a demodulation carrier frequency.

13. The sensor system of claim 1, wherein optical source unit comprises at least one source laser and wherein the coherence modulator provides direct modulation of the source laser for each wavelength channel.

14. The sensor system of claim 13, wherein the source laser is a fiber laser and direct modulation is achieved by periodic strain modulation of the fiber laser.

15. The sensor system of claim 13, wherein the source laser is a diode laser and direct modulation is achieved by periodic modulation of the drive signal of the diode laser.

16. The sensor system of claim 15, wherein the modulation signal has a triangular waveform.

17. The sensor system of claim 13, wherein the source laser is a wavelength tunable diode laser and direct modulation is achieved by periodic modulation of one or more control signals to the wavelength tunable diode laser.

18. The sensor system of claim 17, wherein the laser wavelength is modulated with a triangular waveform.

19. The sensor system of claim 1, wherein the coherence modulator comprises an optical modulator that takes light output from at least one coherent light source as input and modulates the field phasor before it is output from the modulator.

20. The sensor system of claim 19, wherein light from a multiple of coherent light sources operating at different wavelength channels is combined by a wavelength division multiplexer and input to a common optical modulator which modulates all wavelength channels simultaneously.

21. The sensor system of claim 19, wherein the coherence modulator comprises a phase modulator.

22. The sensor system of claim 21, wherein the phase modulator comprises an electro-optical phase modulator.

23. The sensor system of claim 22, wherein the electro-optical phase modulator comprises a lithium niobate phase modulator.

24. The sensor system of claim 21, wherein the phase modulator modulates the phase of the output field phasor of each wavelength channel with a repeated pseudorandom pattern switching between two phase shift values that are separated by $\pi$ radians.

25. The sensor system of claim 21, wherein the phase modulator comprises a piezoelectric ring modulator.

26. The sensor system of claim 25, wherein the phase modulator further comprises a Faraday rotation mirror.

27. The sensor system of claim 25, wherein the phase modulator further comprises a twisted High Birefringence fiber.

28. The sensor system of claim 25, wherein the phase modulator further comprises polarization maintaining fiber, and the input polarization to the polarization maintaining fiber is polarized along one of the polarization maintaining fiber eigenaxes.

29. The sensor system of claim 19, wherein the coherence modulator comprises an acoustooptic modulator.

30. The sensor system of claim 19, wherein the coherence modulator comprises an optical amplitude modulator.

31. The sensor system of claim 1, wherein the coherence modulator comprises an optical modulator that takes light output from at least one coherent light source as input and modulates the field phasor of the light before it is output from the modulator.

32. The sensor system of claim 31, wherein light from a multiple of coherent light sources operating at different wavelength channels is combined by a wavelength division multiplexer and input to a common optical modulator, which modulates all wavelength channels simultaneously.

33. The sensor system of claim 31, wherein the coherence modulator comprises a phase modulator.

34. The sensor system of claim 33, wherein the phase modulator comprises a piezoelectric ring modulator.

35. The sensor system of claim 1, wherein one of the optical pathways in a first sensor interferometer is made sensitive to a physical measurand to be measured.

36. The sensor system of claim 35, wherein one of the pathways in a second sensor interferometer is made insensitive to the physical measurand, thus forming a reference sensor providing information for correction of the measurement made by the first sensor interferometer.

37. The sensor system of claim 35, wherein the physical measurand is an acoustic vibration.

38. The sensor system of claim 35, wherein the physical measurand is an acoustic pressure fluctuation.

39. The sensor system of claim 1, wherein the compensating interferometer comprises optical waveguides.

40. The sensor system of claim 1, wherein the optical network comprises optical waveguides.

41. The sensor system of claim 40, wherein the optical network comprises at least one optical waveguide coupler.

42. The sensor system of claim 1, wherein the optical network comprises at least one optical circulator.

43. The sensor system of claim 1, wherein the optical network comprises a multiple of fiber Bragg gratings acting as optical wavelength selective reflectors to enable wavelength division multiplexing of interferometers.

44. The sensor system of claim 1, wherein the optical network comprises at least one optical wavelength selective coupler to enable wavelength division multiplexing of interferometers.

45. An interferometric sensor system, comprising:
an optical source unit producing light pulses in multiple wavelength channels, wherein the source unit comprises a coherence modulator for modulating an output field phasor of each wavelength channel to produce a broadened optical source power spectrum, the coherence modulator comprising an electro-optic phase modulator;
an optical network comprising a multiple of optical pathways from the source unit to a detection unit, where at least one pair of optical pathways form a sensor interferometer, the sensor interferometer having a sensor delay, wherein the optical network comprises a multiple of fiber Bragg gratings acting as optical wavelength selective reflectors to enable wavelength division multiplexing of interferometers;
the detection unit converting incoming light signals to output electrical signals;
a sampling unit that samples the output electrical signals from the detection unit in a time discrete manner to provide an output signal, where the sampling unit samples the output electrical signals at time instances when a detected signal arising from interfering portions of one of the light pulses having propagated the pair of optical pathways forming a sensor interferometer arrives at the sampling unit; and
a processor for analyzing the output signals from the sampling unit to extract information dependent on the phase of the sensor interferometers.

46. The sensor system of claim 45, wherein a compensating interferometer with optical pathways from its input to its output forming a delay is arranged in a serially coupled manner with the optical network.

47. The sensor system of claim 45, wherein the electro-optic phase modulator comprises a lithium-niobate phase modulator.

48. The sensor system of claim 45, wherein the phase modulator modulates the phase of the output field phasor of each wavelength channel within each light pulse with a modulation pattern switching between two phase shift values that are separated by $\pi$ radians.

49. The sensor system of claim 48, wherein the modulation pattern is repeated between pulses.

50. The sensor system of claim 49, wherein the modulation pattern is a pseudo-random pattern.

51. The sensor system of claim 46, wherein the electro-optic phase modulator comprises a lithium-niobate phase modulator.

52. The sensor system of claim 46, wherein the phase modulator modulates the phase of the output field phasor of each wavelength channel within each light pulse with a modulation pattern switching between two phase shift values that are separated by $\pi$ radians.

53. The sensor system of claim 52, wherein the modulation pattern is repeated between pulses.

54. The sensor system of claim 53, wherein the modulation pattern is a pseudo-random pattern.

55. The sensor system of claim 46, wherein the compensating interferometer comprises optical waveguides.

56. The sensor system of claim 45, wherein the optical network comprises optical waveguides.

57. The sensor system of claim 45, wherein the optical network comprises at least one optical wavelength selective coupler to enable wavelength division multiplexing of interferometers.

58. An interferometric sensor system, comprising:
an optical source unit producing light pulses in at least one wavelength channel, wherein the source unit comprises a coherence modulator for modulating an output field phasor of each wavelength channel to produce a broadened optical source power spectrum, wherein the coherence modulator multiplies the output field phasor of each wavelength channel by a multiplier that can be expressed mathematically as a real number multiplied by a complex number, where the real number is modulated during a pulse between a positive and a negative value, and the variation of the complex number during a pulse is small compared to its absolute value;
an optical network comprising a multiple of optical pathways from the source unit to a detection unit, wherein at least one pair of optical pathways form a sensor interferometer, the sensor interferometer having a sensor delay;
the detection unit converting incoming light signals to output electrical signals;
a sampling unit that samples the output electrical signals from the detection unit in a time discrete manner to provide an output signal, where the sampling unit samples the output electrical signals at time instances when a detected signal arising from interfering portions of one of the light pulses having propagated the pair of optical pathways forming a sensor interferometer arrives at the sampling unit; and a processor for analyzing the output signals from the sampling unit to extract information dependent on the phase of the sensor interferometers.

59. The sensor system of claim 58, wherein a compensating interferometer with optical pathways from its input to its output forming a delay is arranged in a serially coupled manner with the optical network.

60. The sensor system of claim 58, wherein the coherence modulator is set to a low transmission state between the pulses.

61. The sensor system of claim 58, wherein the coherence modulator contributes to apodization of the pulse power envelope.

62. The sensor system of claim 58, wherein the coherence modulator comprises a lithium-niobate Mach Zender modulator and where the phase shifts in the two arms of the interferometer are modulated in a push-pull manner.

63. The sensor system of claim 62, wherein the transitions of the real number between the positive and the negative value are rounded.

64. The sensor system of claim 62, wherein the multiplier comprises a modulation pattern versus time, and where the modulation pattern is repeated between pulses, except for possible phase changes between pulses.

65. The sensor system of claim 62, wherein the modulation pattern is a pseudo-random pattern.

66. The sensor system of claim 59, wherein the coherence modulator comprises a lithium-niobate Mach Zender modulator and where the phase shifts in the two arms of the interferometer are modulated in a push-pull manner.

67. The sensor system of claim 66, wherein the transitions of the real number between the positive and the negative value are rounded.

68. The sensor system of claim 66, wherein the multiplier comprises a modulation pattern versus time, and where the modulation pattern is repeated between pulses, except for a possible phase changes between pulses.

69. The sensor system of claim 66, wherein the modulation pattern is a pseudo-random pattern.

70. The sensor system of claim 59, wherein the compensating interferometer comprises optical waveguides.

71. The sensor system of claim 58, wherein the optical network comprises optical waveguides.

72. The sensor system of claim 58, wherein the optical network comprises a multiple of fiber Bragg gratings acting as optical wavelength selective reflectors to enable wavelength division multiplexing of interferometers.

73. The sensor system of claim 58, wherein the optical network comprises at least one optical wavelength selective coupler to enable wavelength division multiplexing of interferometers.

* * * * *